April 21, 1953   C. SCHWARTZ   2,635,890
VEHICLE HITCH
Filed Oct. 13, 1950
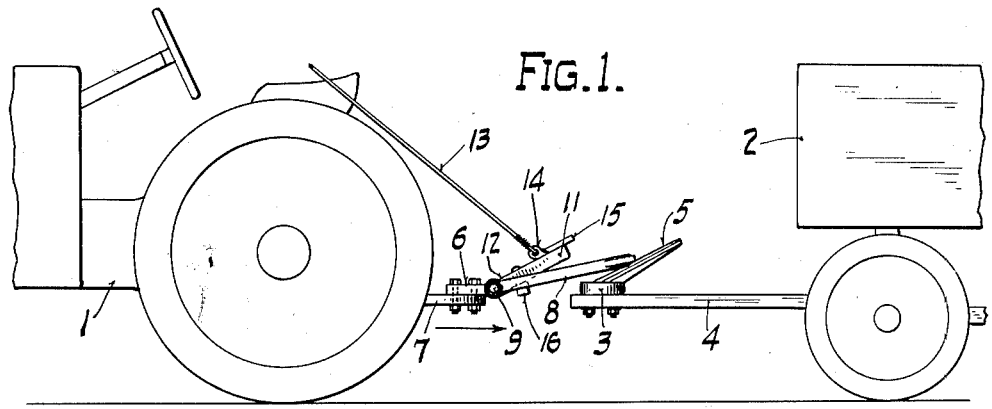
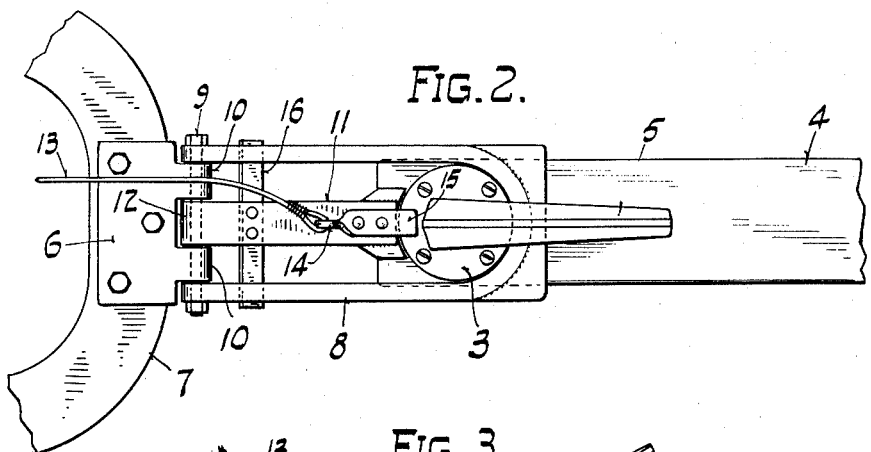
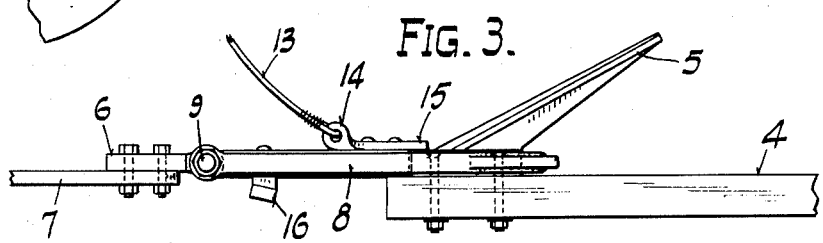
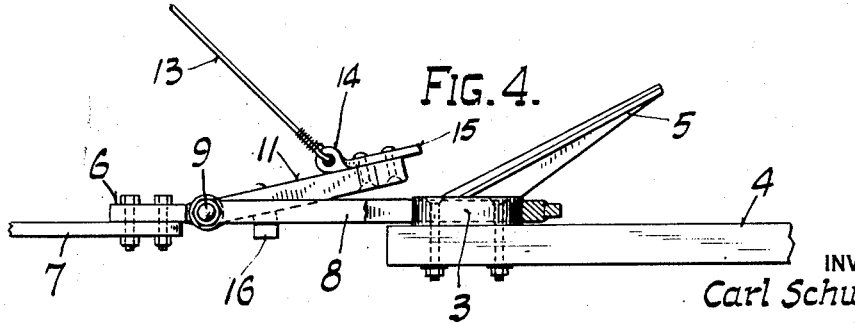
INVENTOR
Carl Schwartz
BY Andrew H Scales
ATTORNEYS.

Patented Apr. 21, 1953

2,635,890

UNITED STATES PATENT OFFICE 2,635,890

VEHICLE HITCH

Carl Schwartz, Elkhart Lake, Wis.

Application October 13, 1950, Serial No. 189,949

5 Claims. (Cl. 280—33.15)

This invention relates to a hitch and particularly relates to a hitch for hitching or connecting together a tractor and a wagon or trailer or other vehicle.

The principal object of the invention is to provide a hitch permitting a driving member like a tractor to be connected to a driven member like a wagon without requiring the operator to dismount from the tractor either to connect or disconnect the parts of the hitch.

Another object is to provide a safety hitch of simple and inexpensive construction.

Another object is to provide a hitch which can be readily connected or disconnected.

These and other objects of the invention will appear hereinafter in connection with the following description of the drawing illustrating an embodiment of the invention in which:

Figure 1 is a side elevational view of a portion of a tractor and wagon showing the hitch about to be made;

Fig. 2 is a top plan view of the hitch after the parts have been joined together;

Fig. 3 is a side elevational view of Fig. 2; and

Fig. 4 is a view similar to Fig. 3 with the latch of the hitch in upward position preparatory to backing the tractor to disconnect the hitch.

In general, the hitch of the invention is formed of two parts, one of which comprises an elongated cam shaft ordinarily secured to the vehicle to be drawn, and the other of which comprises a U-shaped hitching member which is connected to the tractor or driving member and pivoted to ride up the cam shaft when the tractor is backed, to drop over the shaft and make the hitch when the tractor is moved forwardly. A latch member holds the hitching member in place and is lifted by the operator when the tractor is backed to disconnect the hitching member from the cam shaft.

Referring to the drawing, there is shown a portion of a tractor 1 and of a wagon 2 to be connected to the tractor and drawn thereby. The hitch as stated comprises two parts, one part being secured to the tractor and the other part to the wagon. As shown in the drawing that part of the hitch secured to the wagon comprises a base 3 which is bolted or otherwise connected to the outer end of the tongue 4 of wagon 2 and from the center of which slants upwardly toward the wagon an elongated cam shaft 5.

Base 3 is a relatively thick and heavy metal member and is generally circular in shape.

Cam shaft 5 is of tapered width being wider at the base than at the top and carries a central rib on the upper surface to better withstand wear in service.

The base and cam shaft may have other shapes than that shown and described except that the base should provide a circular bearing surface on which the second part of the hitch, to be described, may turn.

The second part of the hitch which is shown as secured to the tractor 1 has a relatively wide and flat bearing plate 6 which is secured to the plate 7 of tractor 1 on the same horizontal plane as that of base 3 of the first part of the hitch.

Extending rearwardly from plate 7 is a metal hitching member 8 of generally U-shape, the elongated legs of which are pivoted to bearing plate 6 by a pin 9 which extends horizontally through the end portion of the legs and the laterally spaced bearing lugs 10 provided on the rear end plate 7.

The inner periphery of hitching member 8 at the outer end portion is circular and is provided complementary to the circular periphery of base 3. The hitch is made by backing the tractor rearwardly whereupon member 8 rides up and over cam shaft 5. When the tractor 1 is then advanced forwardly by the operator the inner periphery of hitching member 8 as described engages base 3 to make the hitch and pull the wagon forwardly. The rear end portion of hitching member 8 which extends rearwardly a substantial distance provides the hitching member with a surface of some extent for riding on cam shaft 5 and strengthens hitching member 8 on the forward pull of the wagon or trailer by the tractor.

In order to secure the parts of the hitch in place so that the hitch connects the tractor and wagon together for pulling or backing the wagon, a latch 11 is pivoted by its tongue 12 to pin 9 between lugs 10 previously described.

Different ways of operating the latch may be provided. In the drawing a cable 13 is secured to a ring 14 in turn connected to the upper surface of the latch toward the rear end thereof. When the operator desires to operate the latch, cable 13 is released by the operator, who is on the tractor, and the latch of its own weight drops until the rearward projection 15 thereof, which may be provided as a projection from ring 14, engages and overlies the upper surface of base 3 of the wagon portion of the hitch. The rim of latch 11 disposed beneath projection 15 is formed complementary to circular base 3 so that in place the latch may bear against the inner periphery of base 3.

In order to disconnect the two parts of the hitch, a transverse bar 16 is secured to the underside of the tongue of latch 11 substantially midway thereof and extends beneath the elongated legs of hitching member 8. When the operator pulls on cable 13, latch 11 is lifted and bar 16 engages hitching member 8. The tractor is then backed toward the wagon as the latch 11 is further lifted by the operator, resulting in the hitching member riding up the underside of cam shaft 5 and thence over the upper end of the same to free the two parts of the hitch as the tractor is then moved forwardly.

The hitch of the invention is inexpensive to construct as it is simple and has few parts. Its employment eliminates the necessity of the operator dismounting from the tractor and entering between the tractor and wagon to either connect or disconnect the hitch parts, thus eliminating a hazard to the operator that has resulted in many fatal accidents. The hitch also can be quickly and easily made or disconnected. Due to the circular base 3 and the parts of the hitch formed complementary thereto the hitching member and latch turn on the base so that the tractor can pull or back the driven member in any direction. The latch permits backing of the driven member without disconnection of the hitch parts.

Various embodiments of the invention may be employed within the scope of the following claims.

I claim:

1. A hitch for joining a driving member and a driven member for moving the latter which comprises an elongated cam shaft slanting upwardly toward the driven member from a base secured to the driven member, a hitching member pivoted to the driving member and projecting therefrom to ride up said cam shaft when the driving member is moved toward said driven member, said hitching member being open on the inside to ride over the end of the cam shaft and engage said base on one side for joining the driving member and driven member together, and latch means pivoted to the driving member and abutting said base on the side opposite the hitching member when the hitching member is in latching position to lock the hitching member in engagement with said base to prevent disengagement of the hitch parts irrespective of forward or rearward movement of the driven member by the driving member.

2. A hitch for joining a driving member and a driven member for moving the latter which comprises an elongated cam shaft slanting upwardly toward the driven member from a base secured to the driven member, a hitching member pivoted to the driving member and projecting therefrom to ride up said cam shaft when the driving member is moved toward said driven member, said hitching member being open on the inside to ride over the end of the cam shaft and engage the base thereof for joining the driving member and driven member together, latch means pivoted to the driving member and extending to the base of the cam shaft in complementary relation to the hitching member to lock the hitching member in engagement with said cam shaft and prevent disengagement of the hitch parts irrespective of forward or rearward movement of the driven member by the driving member, and means secured to said latch means and engaging said hitching member for lifting the later from said cam shaft to break the hitch.

3. A hitch for joining a driving member and a driven member for moving the latter which comprises an elongated cam shaft slanting upwardly toward the driven member from a base secured to the driven member, a hitching member pivoted to the driving member and projecting therefrom to ride up said cam shaft when the driving member is moved toward said driven member, said hitching member being open on the inside to ride over the end of the cam shaft and engage the base thereof for joining the driving member and driven member together, and a latch pivoted to said driving member and extending within said hitching member to the base of said cam shaft to provide a bearing opposite that of the hitching member preventing disengagement of the hitch parts upon movement of the driven member by the driving member.

4. A hitch for joining a driving member and a driven member for moving the latter which comprises an elongated cam shaft slanting upwardly toward the driven member from a base secured to the driven member, a hitching member pivoted to the driving member and projecting therefrom to ride up said cam shaft when the driving member is moved toward said driven member, said hitching member being open on the inside to ride over the end of the cam shaft and engage the base thereof for joining the driving member and driven member together, a latch pivoted to said driving member and extending within said hitching member to the base of said cam shaft to provide a bearing opposite that of the hitching member preventing disengagement of the hitch parts upon movement of the driven member by the driving member, and a bar secured to said latch and extending transversely beneath the latch and hitching member for lifting the hitching member to disengage the same from said cam shaft.

5. A hitch for joining a driving member and a driven member for moving the latter which comprises an elongated cam shaft slanting upwardly toward the driven member from a base secured to the driven member, a generally U-shaped hitching member having the legs thereof pivoted to the driving member and projecting therefrom to ride up and over said cam shaft when the driving member is moved toward said driven member to engage the base of the cam shaft and join the driving and driven members together, a latching tongue pivoted to said driving member within said U-shaped hitching member and extending to the base of the cam shaft to provide a bearing surface opposite the encircling surface of the hitching member, a transverse bar secured to the undersurface of the latching tongue and extending beneath the hitch member, and a cable secured to the outer end portion of the latching tongue and extending to the driving member for lifting of the hitching member by the operator without dismounting from the driving member.

CARL SCHWARTZ.

References Cited in the file of this patent

UNITED STATES PATENTS

| Number | Name | Date |
|---|---|---|
| 356,932 | Fennel | Feb. 1, 1887 |
| 467,421 | Lemon | Jan. 19, 1892 |
| 1,829,959 | Lindaas | Nov. 3, 1931 |